US010282124B2

(12) United States Patent
Rueger et al.

(10) Patent No.: US 10,282,124 B2
(45) Date of Patent: May 7, 2019

(54) OPPORTUNISTIC HANDLING OF FREED DATA IN DATA DE-DUPLICATION

(71) Applicant: International Business Machines Corporation, Armonk, NY (US)

(72) Inventors: Erik Rueger, Ockenheim (DE); Heiko H. Schloesser, Tucson, AZ (US); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 15/190,721

(22) Filed: Jun. 23, 2016

(65) Prior Publication Data

US 2017/0371581 A1 Dec. 28, 2017

(51) Int. Cl.
*G06F 17/30* (2006.01)
*G06F 3/06* (2006.01)

(52) U.S. Cl.
CPC ............ *G06F 3/0641* (2013.01); *G06F 3/061* (2013.01); *G06F 3/0652* (2013.01); *G06F 3/0673* (2013.01); *G06F 17/30117* (2013.01); *G06F 17/30156* (2013.01)

(58) Field of Classification Search
None
See application file for complete search history.

(56) References Cited

U.S. PATENT DOCUMENTS

| 8,412,688 | B1 | 4/2013 | Armangau et al. |
| 8,452,739 | B2 | 5/2013 | Jain et al. |
| 8,732,411 | B1 | 5/2014 | Chatterjee et al. |
| 9,104,839 | B2 * | 8/2015 | Gunda ............... G06F 3/0641 |
| 2009/0083563 | A1 * | 3/2009 | Murase ............... G06F 1/3268 713/324 |
| 2013/0339407 | A1 * | 12/2013 | Sharpe ............. G06F 17/30194 707/827 |
| 2014/0297603 | A1 * | 10/2014 | Kim .................. G06F 17/30159 707/692 |
| 2015/0046409 | A1 | 2/2015 | Sharma et al. |

(Continued)

OTHER PUBLICATIONS

"Data deduplication", https://en.wikipedia.org/wiki/Data_deduplication, retrieved from the Internet Apr. 5, 2016, 3 pages.

(Continued)

*Primary Examiner* — Bai D Vu
(74) *Attorney, Agent, or Firm* — Francis Lammes; Stephen J. Walder, Jr.; Robert M. Sullivan

(57) ABSTRACT

A mechanism is provided for opportunistic handling of freed data in data de-duplication. Responsive to receiving a request to store a file in a storage device, the file is mapped to a set of virtual blocks. For each virtual block in the set of virtual blocks: a hash value is computed, a determination is made as to whether the computed hash value appears within a previously-used information table as associated with an existing data block, and, responsive to the computed hash value appearing within a previously-used information table as associated with an existing data block, a data block entry and hash value associated with the existing data block is moved to a de-duplication information table. The virtual block is then stored as a reference to the existing data block.

20 Claims, 8 Drawing Sheets

(56) References Cited

U.S. PATENT DOCUMENTS

2016/0147797 A1* 5/2016 Dolph ............... G06F 17/30371
707/692

OTHER PUBLICATIONS

"Distributed Data Deduplication Using Storage Agents.", IBM Corporation, www.ip.com; Technical Disclosure, IP.com No. IPCOM000169428D, Apr. 15, 2008, 3 pages.
"Value Added Deduplication Service Solutioning by Data Store Transparency in Hybrid Storage Environments", Disclosed Anonymously, www.ip.com; Technical Disclosure, IP.com No. IPCOM000243753D, Oct. 16, 2015, 9 pages.

* cited by examiner

| DE-DUPLICATION INFORMATION TABLE | | | |
|---|---|---|---|
| DATA BLOCK | STATUS | HASH VALUE | VIRTUAL BLOCK REFERRING |
| 0 | ACTIVE | 1123DA12E34 | VBLOCK0, VBLOCK2 |
| 1 | ACTIVE | 345B5689DAC | VBLOCK1, VBLOCK3 |
| 2 | ACTIVE | 678456EFCBA | VBLOCK4 |
| 3 | FREE | | |
| 4 | FREE | | |
| 5 | FREE | | |

*FIG. 4*

| DE-DUPLICATION INFORMATION TABLE | | | |
|---|---|---|---|
| DATA BLOCK | STATUS | HASH VALUE | VIRTUAL BLOCK REFERRING |
| 0 | ACTIVE | 1123DA12E34 | VBLOCK0 |
| 1 | ACTIVE | 345B5689DAC | VBLOCK1 |
| 2 | BUSY | | |
| 3 | FREE | | |
| 4 | FREE | | |
| 5 | FREE | | |

| PREVIOUSLY-USED INFORMATION TABLE | | | |
|---|---|---|---|
| DATA BLOCK | STATUS | HASH VALUE | VIRTUAL BLOCK REFERRING |
| 2 | PRE-USED | 678456EFCBA | |

*FIG. 5*

| DE-DUPLICATION INFORMATION TABLE | | | |
|---|---|---|---|
| DATA BLOCK | STATUS | HASH VALUE | VIRTUAL BLOCK REFERRING |
| 0 | ACTIVE | 1123DA12E34 | VBLOCK0,VBLOCK5 |
| 1 | ACTIVE | 345B5689DAC | VBLOCK1 |
| 2 | ACTIVE | 678456EFCBA | VBLOCK6 |
| 3 | ACTIVE | 9645AC45CBA | VBLOCK7 |
| 4 | FREE | | |
| 5 | FREE | | |

| PREVIOUSLY-USED INFORMATION TABLE | | | |
|---|---|---|---|
| DATA BLOCK | STATUS | HASH VALUE | VIRTUAL BLOCK REFERRING |
| | | | |

*FIG. 6*

OPPORTUNISTIC HANDLING OF FREED DATA IN DATA DE-DUPLICATION

BACKGROUND

The present application relates generally to an improved data processing apparatus and method and more specifically to mechanisms for an opportunistic handling of freed data in data de-duplication.

Flash storage is any data repository or system that uses flash memory. The size and complexity of such systems ranges from portable Universal Serial Bus (USB) drives to enterprise-class array-based memory systems. Flash storage uses electricity and has no mechanical parts. Flash storage typically consumes only 20% of the power of traditional mechanical hard drives and reads more than one hundred times faster than traditional mechanical hard drives. Most flash storage systems are composed of a memory unit and an access controller. The memory unit is used to store data. The access controller manages and controls access to the storage space on the memory unit. Data is written onto NAND flash memory, NOR flash memory, or a combination of the two.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for opportunistic handling of freed data in data de-duplication. The illustrative embodiments map a file to a set of virtual blocks in response to receiving a request to store the file in a storage device. For each virtual block in the set of virtual blocks: the illustrative embodiments compute a hash value; determine whether the computed hash value appears within a previously-used information table as associated with an existing data block; move a data block entry and hash value associated with the existing data block to a de-duplication information table in response to the computed hash value appearing within a previously-used information table as associated with an existing data block; and store the virtual block as a reference to the existing data block.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 illustrates a de-duplication information table due to a set of files being stored in accordance with an illustrative embodiment;

FIG. 5 illustrates a de-duplication information table and a previously-used information table due to a file being deleted in accordance with an illustrative embodiment;

FIG. 6 illustrates an updated de-duplication information table and previously-used information table due to a new file being stored in accordance with an illustrative embodiment;

DETAILED DESCRIPTION

Figure 1:
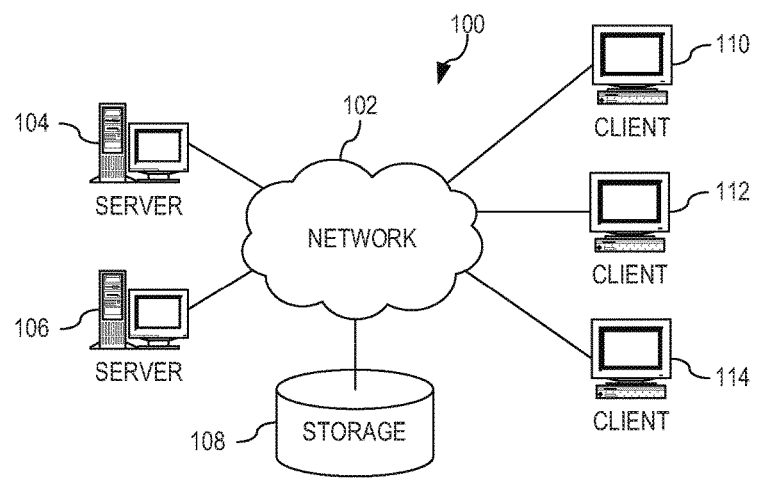
FIG. 1 is an example diagram of a distributed data processing system in which aspects of the illustrative embodiments may be implemented.

Again, a flash storage system is any data repository or system that uses flash memory. However, these flash-based storage systems have a limited number of write and erase cycles. When storing data on flash-based storage systems, it is desirable to reduce the number of writes and erases in order to increase the endurance of the storage. In flash-based storage systems that use lifecycle management to migrate and/or backup data between different tiers and possibly tape, writing, reading, and/or deleting data may be slow due to the required access to slower storage tiers or accessing a tape where the data is stored. Further, once the data is stored, deleting the data in the flash-based storage system triggers an expiration of the data in the backup system, and, if the same data is written again, a new backup is required.

In order to reduce the writes and erases to flash-based storage systems, current flash based storage systems use data de-duplication. Data de-duplication works by computing a hash value for an incoming data block to determine whether data blocks are identical. If an incoming data block is identical to one that has been written, a reference to the first data block is stored instead of writing the identical data again. When a data block is deleted, the reference to the stored data bock is deleted. Only when the last reference to the data block is deleted, is the stored data block actually freed.

The illustrative embodiments provide an opportunistic handling of freed data in data de-duplication utilizing an extension to current data de-duplication systems to reduce the number of writes and erases to a flash-based storage system and to reduce the load on lower storage tiers and backup systems. That is, when a last reference to the data block is deleted, rather than free the data block, the data block is kept and tracked as a previously-used data block in case another incoming data block is again identical to a previously-used data block. Only when the amount of free data blocks in a de-duplication information table falls below a predetermined threshold or another flash-based storage system criteria is met, are one or more previously-used data blocks actually freed for new writes.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
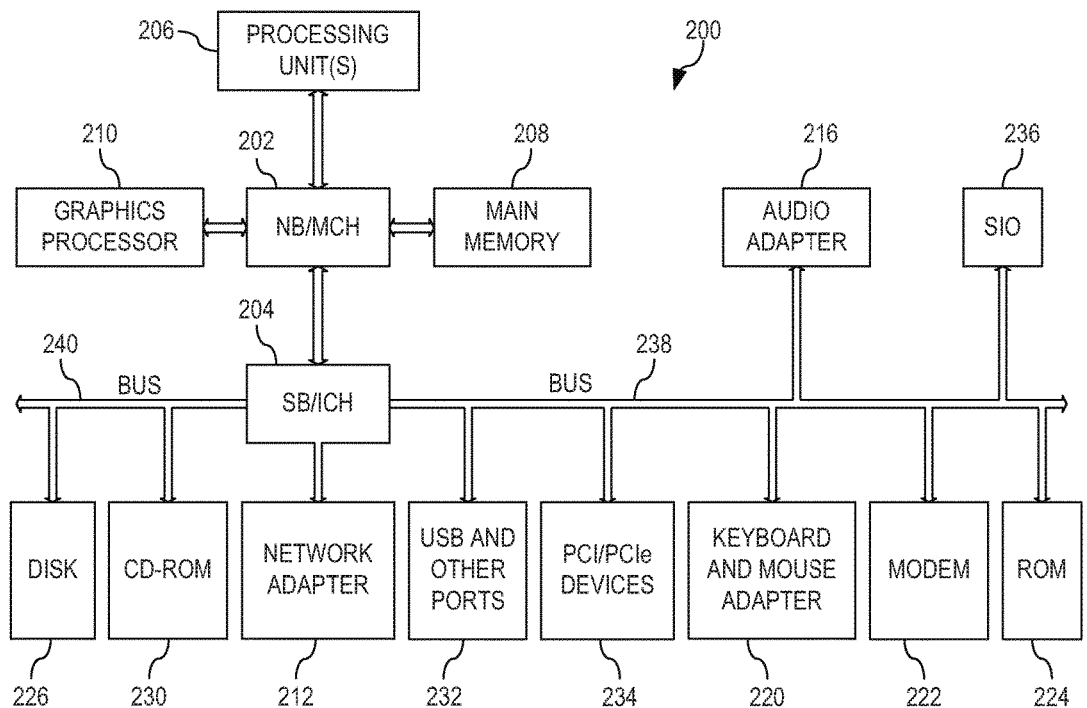
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply arty limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for opportunistic handling of freed data in data de-duplication. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates opportunistic handling of freed data in data de-duplication.

As noted above, the mechanisms of the illustrative embodiments utilize specifically configured computing devices, or data processing systems, to perform the operations for opportunistic handling of freed data in data de-duplication. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® eServer computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the opportunistic handling of freed data in data de-duplication.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
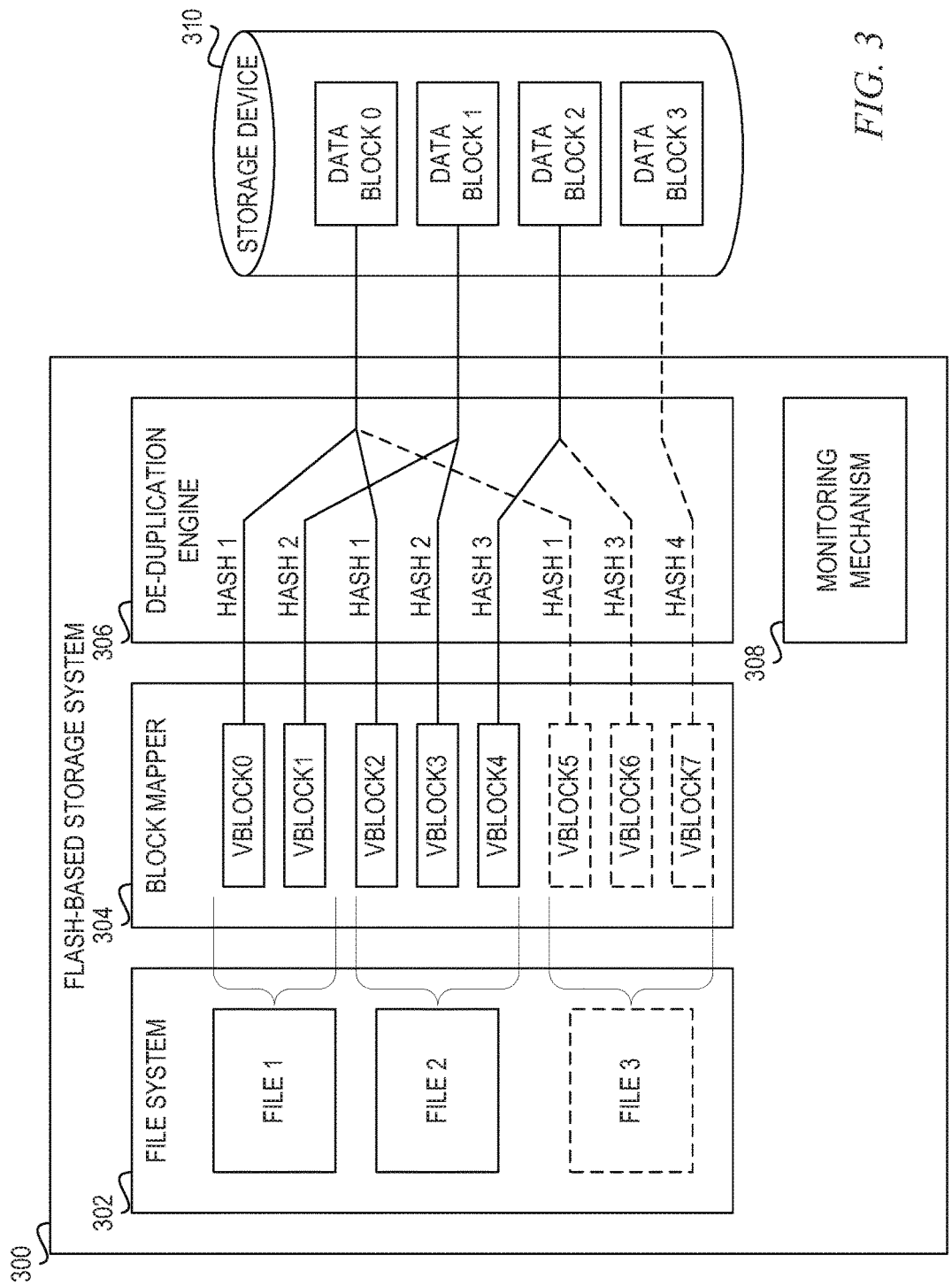
FIG. 3 depicts a block diagram of a flash-based storage system integrated with a de-duplication engine in which aspects of the illustrative embodiments may be implemented.

FIG. 3 depicts a block diagram of a flash-based storage system integrated with a de-duplication engine in which aspects of the illustrative embodiments may be implemented. Flash-based storage system 300 comprises file system 302, block mapper 304, de-duplication engine 306, and storage device 310. In a write operation, file system 302 stores file 1 and file 2 in storage device 310. Block mapper 304 maps file 1 to virtual blocks vblock0 and vblock1 and maps file 2 to virtual blocks vblock2, vblock3, and vblock4.

De-duplication engine 306 performs a hash on each virtual block and eliminates redundant data to shrink storage requirements and improve bandwidth efficiency. In the depicted example, de-duplication engine 306 stores five virtual blocks vblock0, vblock1, vblock2, vblock3, and vblock4 as three data blocks in storage device 310: data block 0, data block 1, and data block 2. The virtual blocks vblock0 and vblock2 have the same hash value; therefore, de-duplication engine 306 stores vblock0 as data block 0 and stores vblock2 as a reference to data block 0. Similarly, the virtual blocks vblock1 and vblock3 have the same hash value; therefore, de-duplication engine 306 stores vblock1 as data block 1 and stores vblock3 as a reference to data block 1. De-duplication engine 306 keeps a de-duplication table (not shown in FIG. 3) to map data blocks to hash values and referring virtual blocks, which is illustrated in FIG. 4.

FIG. 4 illustrates a de-duplication information table due to a set of files being stored in accordance with an illustrative embodiment. This de-duplication information table contains an entry for each data block, with its state as allocated or freed, the hash value, and the list of virtual blocks referring to this data block. For any write request on a virtual block, the de-duplication engine computes a hash value. If the hash value matches with an existing entry in the de-duplication information table, the virtual block entry is added to the virtual block referring column, avoiding the need for a physical disk write. If no matching entry is found, the de-duplication engine searches the de-duplication information table for a free data block, assigns the virtual block to a free data block, and updates the corresponding row of the table with the hash value and virtual block referring, marking the data block as allocated. The server then performs a write for this virtual block to the corresponding data block on the physical device. For a read request, the de-duplication engine refers to the de-duplication information table to identify the associated data block. The server then performs the read operation on the identified data block.

Returning to FIG. 3, for a delete request, de-duplication engine 306 refers to the de-duplication information table to identify the associated data block. If the virtual block referring column associated with the data block comprises more than one virtual block entry, indicating the data block is referenced by more than one file, then de-duplication engine 306 deletes the virtual block entry from the virtual block referring column. If the virtual block referring column associated with the data block comprises only one virtual block entry indicating that it is the last reference to the data block, rather than erase the data from the data block, i.e. delete that data block from storage device 310, de-duplication engine 306 moves the data block entry and associated hash value to a previously-used information table (not shown in FIG. 3) to track previously-used data blocks, which is illustrated in FIG. 5.

FIG. 5 illustrates a de-duplication information table and a previously-used information table due to a file being deleted in accordance with an illustrative embodiment. In accordance with an example of the illustrative embodiments, if file 2 which corresponds to virtual blocks vblock2, vblock3, and vblock4 as shown in FIG. 3 is deleted, then the de-duplication engine would compute the hash values of each data block and refer to the de-duplication information table of FIG. 4. For vblock 2, the deduplication logic would remove the vblock2 reference from data block 0, and, for vblock 3, the deduplication logic would remove the vblock3 reference from data block 1. However, for vblock4 rather than actually freeing up data block 2, the deduplication engine would move the data block 2 entry and hash value to the previously-used information table and optionally mark the moved data block line as busy for later activation.

Returning once again to FIG. 3, when a new file is received, in a write operation, file system 302 stores file 3 in storage device 310. Block mapper 304 maps file 3 to virtual blocks vblock5, vblock6, and vblock7. De-duplication engine 306 performs a hash on each virtual block and eliminates redundant data to shrink storage requirements and improve bandwidth efficiency. Deduplication logic compares the computed hash values to those hash values not only in the de-duplication information table but also to the previously-used information table. In the instant example, the hash value of vblock5 is the same as the hash value of vblock0 in the de-duplication information table; therefore, de-duplication engine 306 stores vblock5 as a reference to data block 0. In the instant example, the hash value of vblock6 is the same as the hash value of data block 2 in the previously-used information table; therefore, de-duplication engine 306 moves the data block 2 entry and hash value to the de-duplication information table and stores vblock6 as a reference to data block 2. For vblock7, de-duplication engine 306 stores vblock7 as data block 3, which is illustrated in the updated de-duplication information table of FIG. 6. That is, FIG. 6 illustrates an updated de-duplication information table and previously-used information table due to a new file being stored in accordance with an illustrative embodiment.

With the previously-used data blocks kept in the previously-used information table, at some point, the flash-based storage system will run out of space to store new unique data blocks. Therefore, when a number of free data blocks in a de-duplication information table falls below a predetermined threshold or another flash-based storage system criteria is met, such as an administrator triggering a cleanup of the previously-used information table, the number of previously-used data blocks exceeding a predetermined threshold, or the like, monitoring mechanism 308 initiates a cleanup of the previously-used information table. The cleanup of the previously-used information table may be performed in numerous different ways. In a first embodiment, monitoring mechanism 308 may erase those previously-used data blocks that are oldest. Starting with the oldest data block, monitoring mechanism erases the associated data from storage device 310, deletes the hash value associated with the data block, and then adds the data block back to the de-duplication information table indicating the status of the data block as free. Monitoring mechanism 308 then determines whether the number of free data blocks in a de-duplication information table is still below the predetermined threshold. If so, monitoring mechanism repeats the process until the number of free data blocks in the de-duplication information table is above the predetermined threshold.

In a second embodiment, monitoring mechanism 308 may erase those previously-used data blocks that are the largest in size. Starting with the largest data block, monitoring mechanism erases the associated data from storage device 310, deletes the hash value associated with the data block, and then adds the data block back to the de-duplication information table indicating the status of the data block as free. Monitoring mechanism 308 then determines whether the number of free data blocks in a de-duplication information table is still below the predetermined threshold. If so, monitoring mechanism repeats the process until the number of free data blocks in the de-duplication information table is above the predetermined threshold.

In a third embodiment, monitoring mechanism 308 may erase those previously-used data blocks that are oldest and are indicated as critical, private, secure, or the like. That is, in this embodiment, as data is stored in the de-duplication information table, the data block may be marked with a flag indicating that the data in the data block is critical data, private data, secure data, or the like. Therefore, even when the data block is no longer being actively used and moved to the previously-used information table, the flag indicating that the data in the data block is critical data, private data, secure data, or the like, moves with the data block. Thus, data blocks with such a flag are considered more important and should be kept over other data blocks without such a flag. Accordingly, starting with the oldest data block that does not have a flag indicating the data in the data block as important, monitoring mechanism erases the associated data from storage device 310, deletes the hash values associated with the data block, and then adds the data block back to the de-duplication information table indicating the status of the data block as free. Monitoring mechanism 308 then determines whether the number of free data blocks in a de-duplication information table is still below the predetermined threshold. If so, monitoring mechanism repeats the process until the number of free data blocks in the de-duplication information table is above the predetermined threshold.

While only three exemplary embodiments have been illustrated, many modifications and variations will be apparent to those of ordinary skill in the art without departing from the scope and spirit of the described embodiments. Furthermore, the provided embodiment may be combined such that monitoring mechanism 308 may execute two or more embodiments at one time. For example, monitoring mechanism 308 may identify data blocks that are the largest out of a set of oldest data blocks and erases those data blocks first.

Thus, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
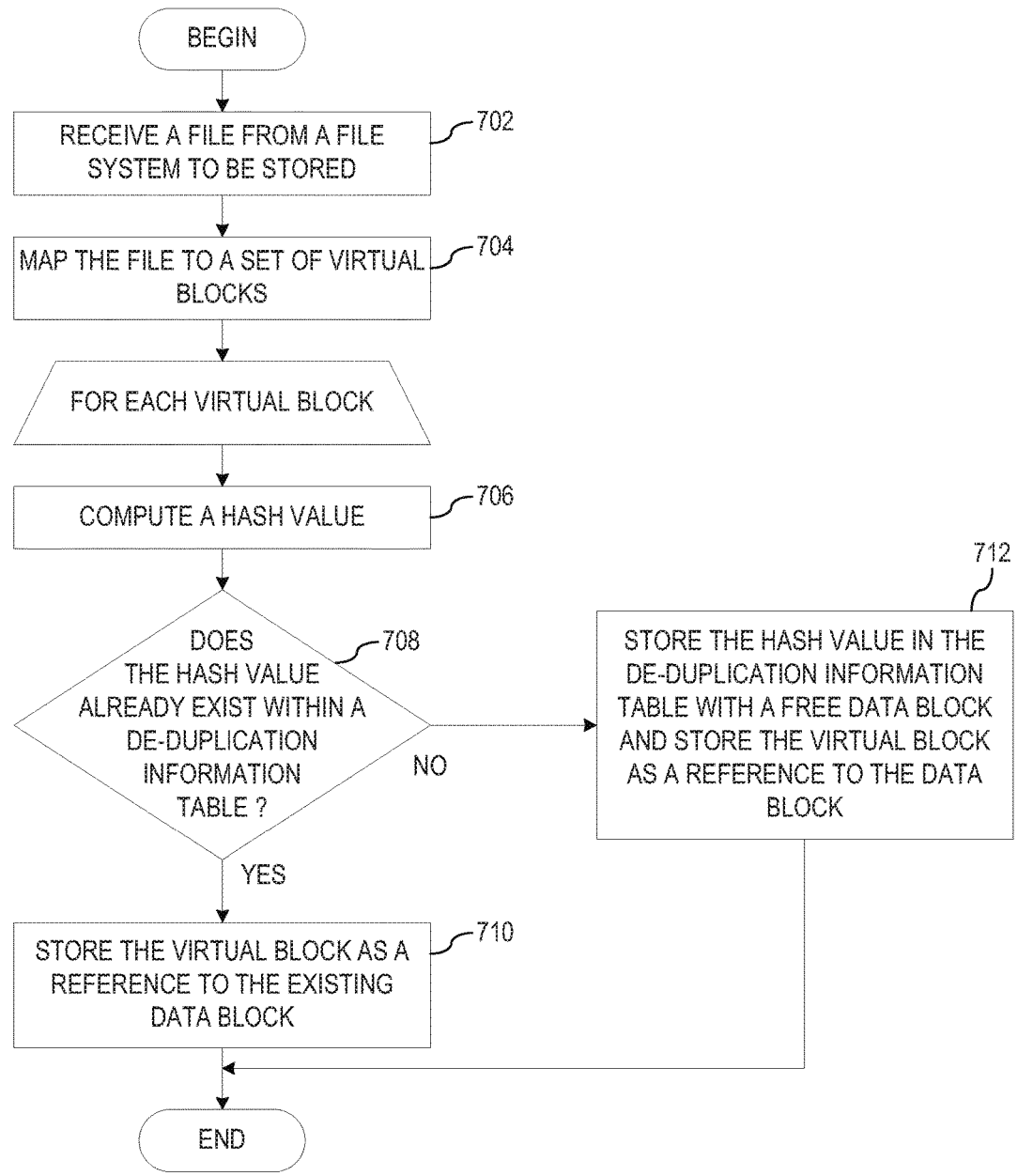
FIG. 7 depicts a flowchart of the operation performed in writing new data associated with a file to a set of data blocks using a de-duplication information table in accordance with an illustrative embodiment.

FIG. 7 depicts a flowchart of the operation performed in writing new data associated with a file to a set of data blocks using a de-duplication information table in accordance with an illustrative embodiment. As the operation begins, a block mapper receives a file from a file system to be stored (step 702). The block mapper maps the file to a set of virtual blocks (step 704). For each virtual block, a de-duplication engine computes a hash value (step 706) and determines whether the hash value already exists within a de-duplication information table as associated with an existing data block (step 708). If at step 708 the hash value already exists within the de-duplication information table as associated with an existing data block, the de-duplication engine stores the virtual block as a reference to the existing data block (step 710), with the operation ending thereafter. If at step 708 the hash value fails to exist within the de-duplication information table as associated with an existing data block, the de-duplication engine stores the hash value in the de-duplication information table with a free data block and stores the virtual block as a reference to the data block (step 712), with the operation ending thereafter.

Figure 8:
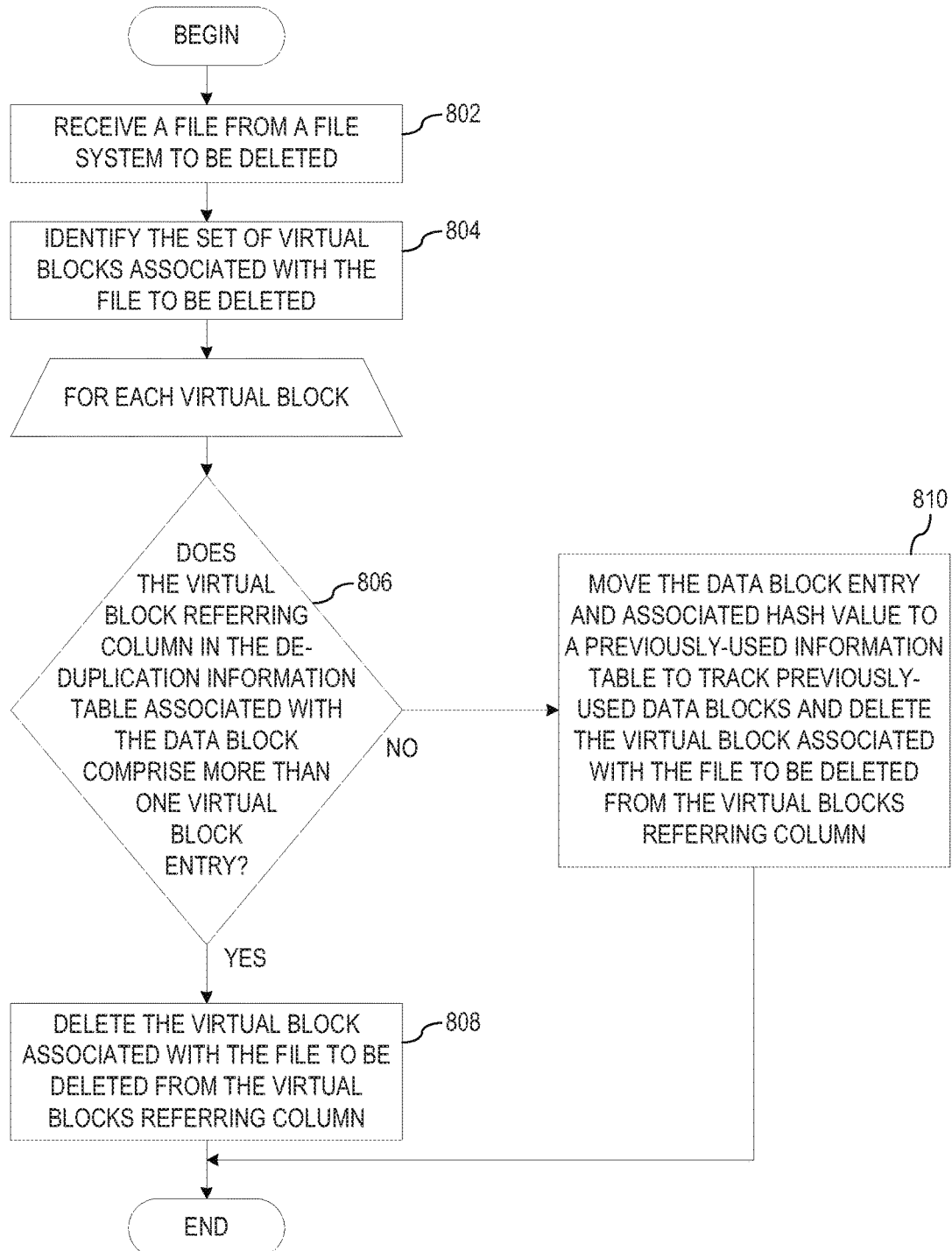
FIG. 8 depicts a flowchart of the operation performed in deleting data of an existing file from a set of data blocks in accordance with an illustrative embodiment.

FIG. 8 depicts a flowchart of the operation performed in deleting data of an existing file from a set of data blocks in accordance with an illustrative embodiment. As the operation begins, the de-duplication engine receives the file to be deleted (step 802) and identifies the set of virtual blocks associated with the file to be deleted (step 804). For each virtual block, the de-duplication mechanism determines whether the virtual block referring column in the de-duplication information table associated with the data block comprises more than one virtual block entry (step 806). If at step 806 the virtual block referring column in the de-duplication information table associated with the data block comprises more than one virtual block entry, then the de-duplication mechanism deletes the virtual block associated with the file to be deleted from the virtual block referring column (step 808), with the operation ending thereafter. If at step 806 the virtual block referring column in the de-duplication information table associated with the data block comprises only one virtual block entry, the de-duplication mechanism moves the data block entry and associated hash value to a previously-used information table to track previously-used data blocks and deletes the virtual block associated with the file to be deleted from the virtual block referring column (step 810), with the operation ending thereafter.

Figure 9:
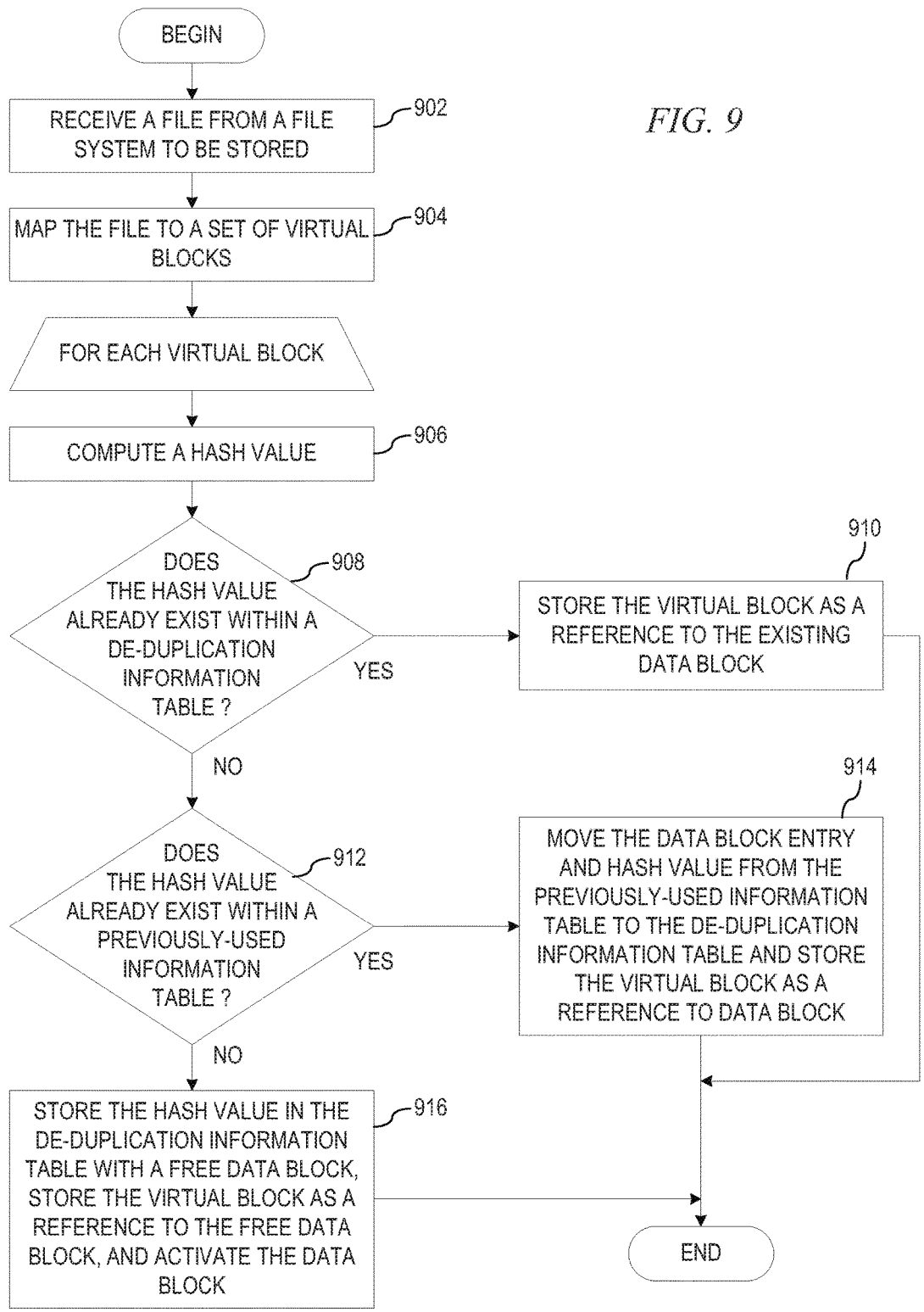
FIG. 9 depicts a flowchart of the operation performed in writing new data associated with a file to a set of data blocks using a de-duplication information table and a previously-used information table in accordance with an illustrative embodiment.

FIG. 9 depicts a flowchart of the operation performed in writing new data associated with a file to a set of data blocks using a de-duplication information table and a previously-used information table in accordance with an illustrative embodiment. As the operation begins, a block mapper receives a file from a file system to be stored (step 902). The block mapper maps the file to a set of virtual blocks (step 904). For each virtual block, a de-duplication engine computes a hash value (step 906) and determines whether the hash value already exists within a de-duplication information table as associated with an existing data block (step 908). If at step 908 the hash value already exists within the de-duplication information table as associated with an existing data block, the de-duplication engine stores the virtual block as a reference to the existing data block (step 910), with the operation ending thereafter. If at step 908 the hash value fails to exist within the de-duplication information table as associated with an existing data block, the de-duplication engine determines whether the hash value exists within a previously-used information table as associated with an existing data block (step 912). If at step 912 the hash value already exists within the previously-used information table as associated with an existing data block, then the de-duplication engine moves the data block entry and hash value from the previously-used information table to the de-duplication information table and stores the virtual block as a reference to data block (step 914), with the operation ending thereafter. If at step 912 the hash value fails to exist within the previously-used information table as associated with an existing data block, the de-duplication engine stores the hash value in the de-duplication information table with a free data block, stores the virtual block as a reference to the free data block, and changes the status of the free data block to active (step 916), with the operation ending thereafter.

Figure 10:
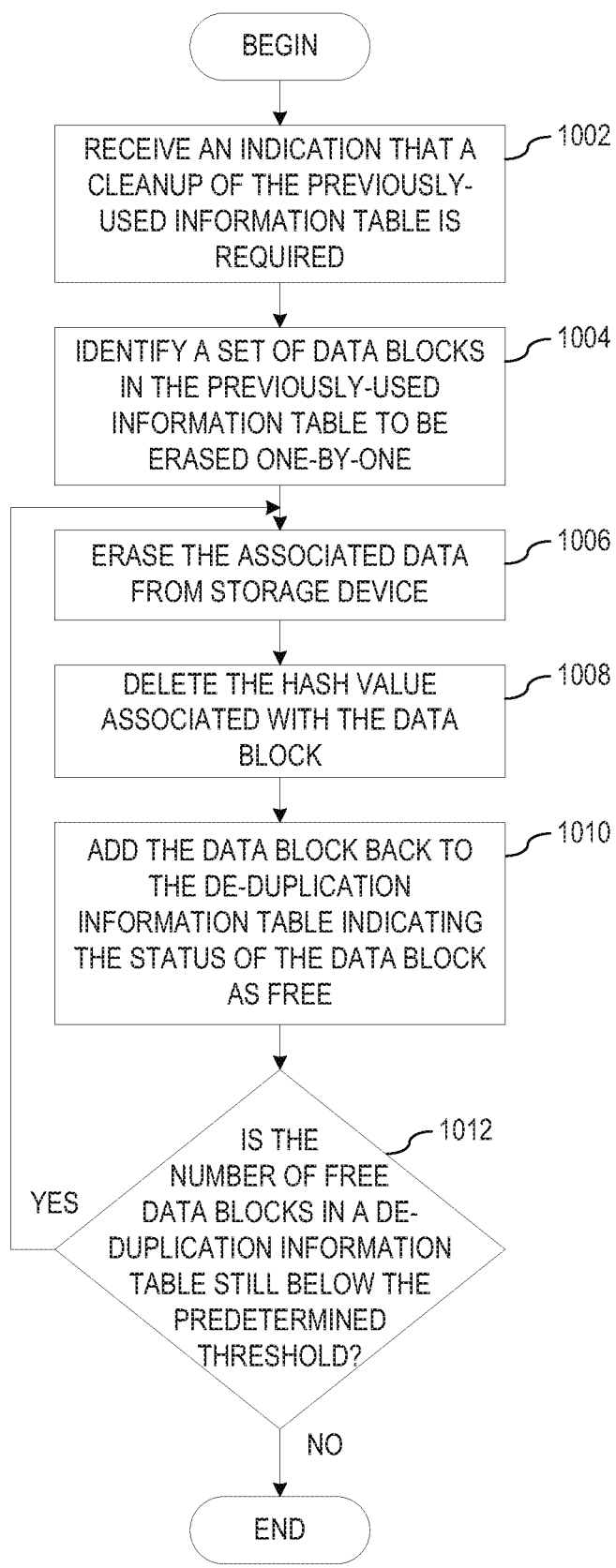
FIG. 10 depicts a flowchart of the operation performed in cleaning up a previously-used information table in accordance with an illustrative embodiment.

FIG. 10 depicts a flowchart of the operation performed in cleaning up a previously-used information table in accordance with an illustrative embodiment. As the operation begins, a monitoring mechanism receives an indication that a cleanup of the previously-used information table is required (step 1002). The indication may be when a number of free data blocks in a de-duplication information table falls below a predetermined threshold or another flash-based storage system criteria is met, such as an administrator triggering a cleanup of the previously-used information table, the number of previously-used data blocks exceeding a predetermined threshold, or the like. The monitoring mechanism identifies a set of data blocks in the previously-used information table to be erased one-by-one (step 1004). The identification of the set of data blocks may be based on at least one of the oldest data blocks, the largest data blocks, data blocks that are not considered important, or any combination of these criteria. Then for each of the set of identified data blocks one-by-one, the monitoring mechanism erases the associated data from storage device (step 1006), deletes the hash value associated with the data block (step 1008), and adds the data block back to the de-duplication information table indicating the status of the data block as free (step 1010). The monitoring mechanism then determines whether a number of free data blocks in a de-duplication information table is still below the predetermined threshold (step 1012). If at step 1012 the number of free data blocks in a de-duplication information table is still below the predetermined threshold, the operation returns to step 1006 until the number of free data blocks in the de-duplication information table is above the predetermined threshold. If at step 1012 the number of free data blocks in a de-duplication information table is above the predetermined threshold, the operation terminates.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for an opportunistic handling of freed data in data de-duplication utilizing an extension to current data de-duplication systems to reduce the number of writes and erases to a flash-based storage system and to reduce the load on lower storage tiers and backup systems. Thus, when a last reference to the data block is deleted, rather than free the data block, the data block is kept and tracked as a previously-used data block in case another incoming data block is again identical to a previously-used data block. Only when the amount of free data blocks in a de-duplication information table falls below a predetermined threshold or another flash-based storage system criteria is met, are one or more previously-used data blocks actually freed for new writes.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for opportunistic handling of freed data in data de-duplication, the method comprising:
    responsive to receiving a request to store a file in a storage device, mapping, by a block mapper of the data processing system, the file to a set of virtual blocks; and
    for each virtual block in the set of virtual blocks:
        computing, by a de-duplication engine of the data processing system, a hash value;
        determining, by the de-duplication engine, whether the computed hash value appears within a previously-used information table as associated with an existing data block;
        responsive to the computed hash value appearing within a previously-used information table in the data processing system as associated with an existing data block, moving, by the de-duplication engine, a data block entry and hash value associated with the existing data block to a de-duplication information table in the data processing system; and
        storing, by the de-duplication engine, the virtual block in a virtual block referring column of the de-duplication information table as a reference to the existing data block.

2. The method of claim 1, further comprising:
    for each virtual block in the set of virtual blocks:
        determining, by the de-duplication engine, whether the computed hash value appears within a de-duplication information table as associated with an existing data block; and
        responsive to the computed hash value appearing within a de-duplication information table as associated with an existing data block, storing, by the de-duplication engine, the virtual block in the virtual block referring column of the de-duplication information table as a reference to the existing data block.

3. The method of claim 2, further comprising:

for each virtual block in the set of virtual blocks:
  responsive to the computed hash value failing to appear within the previously-used information table as associated with an existing data block or within the de-duplication information table as associated with an existing data block, storing, by the de-duplication engine, the hash value in a hash value column of the de-duplication information table with a free data block;
  storing, by the d-duplication engine, the virtual block in the virtual block referring column of the de-duplication information table as a reference to the free data block; and
  changing, by the de-duplication engine, the status of the free data block to active.

4. The method of claim 1, further comprising:

responsive to receiving a request to delete a file in the storage device, identifying, by the de-duplication engine, a set of virtual blocks associated with the file to be deleted; and for each virtual block in the set of virtual blocks:
  determining, by the de-duplication engine, whether the virtual block referring column in the de-duplication information table associated with the data block comprises more than one virtual block entry;
  responsive to the virtual block referring column in the de-duplication information table associated with the data block comprising more than one virtual block entry, deleting, by the de-duplication engine, the virtual block associated with the file to be deleted from the virtual block referring column of the de-duplication information table; and
  responsive to the virtual block referring column in the de-duplication information table associated with the data block comprising only one virtual block entry, moving, by the de-duplication engine, the data block entry and associated hash value to the previously-used information table to track previously-used data blocks and deleting, by the de-duplication engine, the virtual block associated with the file to be deleted from the virtual block referring column.

5. The method of claim 1, further comprising:

responsive to receiving a request to clean up the previously-used information table, identifying, by a monitoring mechanism in the data processing system, a set of data blocks in the previously-used information table to be erased one-by-one;

for each of the set of identified data blocks one-by-one:
  erasing, by the monitoring mechanism, the associated data from the storage device;
  deleting, by the monitoring mechanism, the hash value associated with the data block;
  adding, by the monitoring mechanism, the data block back to the de-duplication information table indicating the status of the data block as free;
  determining, by the monitoring mechanism, whether a number of free data blocks in a de-duplication information table is below a predetermined threshold; and
  responsive to the number of free data blocks in a de-duplication information table remaining below the predetermined threshold, proceeding, by the monitoring mechanism, with a next identified data block until the number of free data blocks in the de-duplication information table is above the predetermined threshold.

6. The method of claim 5, wherein the request to clean up the previously-used information table is responsive to at least one of the number of free data blocks in a de-duplication information table falling below a predetermined threshold, an administrator triggering a cleanup of the previously-used information table, or a number of previously-used data blocks exceeding another predetermined threshold.

7. The method of claim 5, wherein the identification of the set of data blocks in the previously-used information table is based on at least one of oldest data blocks, largest data blocks, or data blocks that are not considered important.

8. A computer program product comprising a computer readable storage medium having a computer readable program stored therein, wherein the computer readable program, when executed on a computing device, causes the computing device to:

responsive to receiving a request to store a file in a storage device, map, by a block mapper of the computing device, the file to a set of virtual blocks; and for each virtual block in the set of virtual blocks:
  compute, by a de-duplication engine of the computing device, a hash value;
  determine, by the de-duplication engine, whether the computed hash value appears within a previously-used information table as associated with an existing data block;
  responsive to the computed hash value appearing within a previously-used information table in the computing device as associated with an existing data block, move, by the de-duplication engine, a data block entry and hash value associated with the existing data block to a de-duplication information table in the computing device; and
  store, by the de-duplication engine, the virtual block in a virtual block referring column of the de-duplication information table as a reference to the existing data block.

9. The computer program product of claim 8, wherein the computer readable program further causes the computing device to:

for each virtual block in the set of virtual blocks:
  determine, by the de-duplication engine, whether the computed hash value appears within a de-duplication information table as associated with an existing data block; and
  responsive to the computed hash value appearing within a de-duplication information table as associated with an existing data block, store, by the de-duplication engine, the virtual block in the virtual block referring column of the dc-duplication information table as a reference to the existing data block.

10. The computer program product of claim 9, wherein the computer readable program further causes the computing device to:

for each virtual block in the set of virtual blocks:
  responsive to the computed hash value failing to appear within the previously-used information table as associated with an existing data block or within the de-duplication information table as associated with an existing data block, store, by the de-duplication engine, the hash value in a hash value column of the de-duplication information table with a free data block;

store, by the de-duplication engine, the virtual block in the virtual block referring column of the de-duplication information table as a reference to the free data block; and change, by the de-duplication engine, the status of the free data block to active.

11. The computer program product of claim 8, wherein the computer readable program further causes the computing device to:

responsive to receiving a request to delete a file in the storage device, identify, by the de-duplication engine, a set of virtual blocks associated with the file to be deleted; and for each virtual block in the set of virtual blocks:
determine, by the de-duplication engine, whether the virtual block referring column in the de-duplication information table associated with the data block comprises more than one virtual block entry;

responsive to the virtual block referring column in the de-duplication information table associated with the data block comprising more than one virtual block entry, delete, by the de-duplication engine, the virtual block associated with the file to be deleted from the virtual block referring column of the de-duplication information table; and responsive to the virtual block referring column in the de-duplication information table associated with the data block comprising only one virtual block entry, move, by the de-duplication engine, the data block entry and associated hash value to the previously-used information table to track previously-used data blocks and delete, by the de-duplication engine, the virtual block associated with the file to be deleted from the virtual block referring column.

12. The computer program product of claim 8, wherein the computer readable program further causes the computing device to:

responsive to receiving a request to clean up the previously-used information table, identify, by a monitoring mechanism in the computing device, a set of data blocks in the previously-used information table to be erased one-by-one;

for each of the set of identified data blocks one-by-one:
erase, by the monitoring mechanism, the associated data from the storage device;
delete, by the monitoring mechanism, the hash value associated with the data block;
add, by the monitoring mechanism, the data block back to the de-duplication information table indicating the status of the data block as free;
determine, by the monitoring mechanism, whether a number of free data blocks in a de-duplication information table is below a predetermined threshold; and
responsive to the number of free data blocks in a de-duplication information table remaining below the predetermined threshold, proceed, by the monitoring mechanism, with a next identified data block until the number of free data blocks in the de-duplication information table is above the predetermined threshold.

13. The computer program product of claim 12, wherein the request to clean up the previously-used information table is responsive to at least one of the number of free data blocks in a de-duplication information table falling below a predetermined threshold, an administrator triggering a cleanup of the previously-used information table, or a number of previously-used data blocks exceeding another predetermined threshold.

14. The computer program product of claim 12, wherein the identification of the set of data blocks in the previously-used information table is based on at least one of oldest data blocks, largest data blocks, or data blocks that are not considered important.

15. An apparatus comprising:
a processor; and
a memory coupled to the processor, wherein the memory comprises instructions which, when executed by the processor, cause the processor to:
responsive to receiving a request to store a file in a storage device, map, by a block mapper of the apparatus, the file to a set of virtual blocks; and
for each virtual block in the set of virtual blocks:
compute, by a de-duplication engine of the apparatus, a hash value;
determine, by the de-duplication engine, whether the computed hash value appears within a previously-used information table as associated with an existing data block;
responsive to the computed hash value appearing within a previously-used information table in the apparatus as associated with an existing data block, move, by the de-duplication engine, a data block entry and hash value associated with the existing data block to a de-duplication information table; and
store, by the de-duplication engine, the virtual block in a virtual block referring column of the de-duplication information table as a reference to the existing data block.

16. The apparatus of claim 15, wherein the instructions further cause the processor to:
for each virtual block in the set of virtual blocks:
determine, by the de-duplication engine, whether the computed hash value appears within a de-duplication information table as associated with an existing data block; and
responsive to the computed hash value appearing within a de-duplication information table as associated with an existing data block, store, by the de-duplication engine, the virtual block in the virtual block referring column of the de-duplication information table as a reference to the existing data block.

17. The apparatus of claim 16, wherein the instructions further cause the processor to:
for each virtual block in the set of virtual blocks:
responsive to the computed hash value failing to appear within the previously-used information table as associated with an existing data block or within the de-duplication information table as associated with an existing data block, store, by the de-duplication engine, the hash value in a hash value column of the de-duplication information table with a free data block;
store, by the de-duplication engine, the virtual block in the virtual block referring column of the de-duplication information table as a reference to the free data block; and
change, by the de-duplication engine, the status of the free data block to active.

18. The apparatus of claim 15, wherein the instructions further cause the processor to:

responsive to receiving a request to delete a file in the storage device, identify, by the de-duplication engine, a set of virtual blocks associated with the file to be deleted; and for each virtual block in the set of virtual blocks:
determine, by the de-duplication engine, whether the virtual block referring column in the de-duplication information table associated with the data block comprises more than one virtual block entry;
responsive to the virtual block referring column in the de-duplication information table associated with the data block comprising more than one virtual block entry, delete, by the de-duplication engine, the virtual block associated with the file to be deleted from the virtual block referring column of the de-duplication information table; and
responsive to the virtual block referring column in the de-duplication information table associated with the data block comprising only one virtual block entry, move, by the de-duplication engine, the data block entry and associated hash value to the previously-used information table to track previously-used data blocks and delete, by the de-duplication engine, the virtual block associated with the file to be deleted from the virtual block referring column.

19. The apparatus of claim 15, wherein the instructions further cause the processor to:
responsive to receiving a request to clean up the previously-used information table, identify, by a monitoring mechanism in the apparatus, a set of data blocks in the previously-used information table to be erased one-by-one;

for each of the set of identified data blocks one-by-one:
erase, by the monitoring mechanism, the associated data from storage device;
delete, by the monitoring mechanism, the hash value associated with the data block;
add, by the monitoring mechanism, the data block back to the de-duplication information table indicating the status of the data block as free;
determine, by the monitoring mechanism, whether a number of free data blocks in a de-duplication information table is below a predetermined threshold; and
responsive to the number of free data blocks in a de-duplication information table remaining below the predetermined threshold, proceed, by the monitoring mechanism, with a next identified data block until the number of free data blocks in the de-duplication information table is above the predetermined threshold.

20. The apparatus of claim 19, wherein the request to clean up the previously-used information table is responsive to at least one of the number of free data blocks in a de-duplication information table falling below a predetermined threshold, an administrator triggering a cleanup of the previously-used information table, or a number of previously-used data blocks exceeding another predetermined threshold and wherein the identification of the set of data blocks in the previously-used information table is based on at least one of oldest data blocks, largest data blocks, or data blocks that are not considered important.

* * * * *